United States Patent
Quezada et al.

(10) Patent No.: US 12,459,755 B2
(45) Date of Patent: Nov. 4, 2025

(54) FLEXIBLE GAP FILLER

(71) Applicant: INTELLIGRATED HEADQUARTERS, LLC, Mason, OH (US)

(72) Inventors: Rodrigo Valencia Quezada, Mexico City (MX); Jaime Enrique Legarreta Seyffert, Mexico City (MX); Frida Daniela García de Hoyos, Mexico City (MX); Pedro Morales Delgadillo, Mexico City (MX); Aide Fernanda Flores Fernandez, Mexico City (MX)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 198 days.

(21) Appl. No.: 18/352,755

(22) Filed: Jul. 14, 2023

(65) Prior Publication Data
US 2025/0019182 A1  Jan. 16, 2025

(51) Int. Cl.
*B65G 47/66* (2006.01)
(52) U.S. Cl.
CPC .................. *B65G 47/66* (2013.01)
(58) Field of Classification Search
None
See application file for complete search history.

(56) References Cited

U.S. PATENT DOCUMENTS

| | | | | |
|---|---|---|---|---|
| 5,551,912 A * | 9/1996 | Takemoto | ............... | G07D 9/00 453/56 |
| 9,656,810 B1 * | 5/2017 | Layne | ............. | B65G 15/28 |
| 9,878,857 B2 * | 1/2018 | Itoh | ............ | B65G 15/12 |
| 10,569,959 B1 * | 2/2020 | Rodgers | ............... | B65G 47/96 |
| 11,873,166 B2 * | 1/2024 | Briano | .............. | B65G 47/66 |
| 12,172,849 B2 * | 12/2024 | Li | ............ | B07C 3/08 |

FOREIGN PATENT DOCUMENTS

| | | |
|---|---|---|
| CN | 205873042 U | 1/2017 |
| CN | 106966104 A | 7/2017 |
| CN | 107499852 B | 5/2019 |
| DE | 29724763 U1 | 12/2003 |
| IT | 202100024740 A1 | 3/2023 |
| WO | 2021/090268 A1 | 5/2021 |

OTHER PUBLICATIONS

Extended European Search Report Mailed on Nov. 18, 2024 for EP Application No. 24181519, 7 page(s).

* cited by examiner

*Primary Examiner* — Kavel Singh
(74) *Attorney, Agent, or Firm* — Alston & Bird LLP

(57) ABSTRACT

A gap filler is provided. The gap filler can include a sheet having a sheet first end and a sheet second end. The gap filler can include a first frame coupled to the sheet first end. The gap filler can include a second frame coupled to the sheet second end. The sheet can be configured to be compressed between the first frame and the second frame such that the first frame extends in a direction angled away from the second frame.

20 Claims, 5 Drawing Sheets

FLEXIBLE GAP FILLER

TECHNICAL FIELD

The present application relates generally, in some examples, to a gap filler. More specifically, the present application relates, in some examples, to a flexible triangular gap filler for chutes.

BACKGROUND

Chutes are often used to connect two conveyors. For example, a chute may be placed at the end of a first conveyor so as to allow for the transport of an item from the first conveyer to a next conveyor. The inventors have identified numerous deficiencies and problems with the existing technologies in this field. For example, existing chutes may be angled relative to a conveyor. Such angles can create a gap in which objects may become stuck. In addition, each chute may be angled differently, and so traditional methods require designing and manufacturing a custom gap filler for each chute. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

In an example embodiment, a gap filler is provided. The example gap filler includes a sheet having a sheet first end and a sheet second end, where the sheet first end and the sheet second end are on opposing ends of the sheet. The example gap filler includes a first frame coupled to the sheet first end. The example gap filler includes a second frame coupled to the sheet second end. In an example embodiment, the sheet is shaped into a fan-like formation when the first frame extends in a direction angled away from the second frame.

In an example embodiment, the sheet is made of metal.

In an example embodiment, at least one of the first frame or the second frame is made of metal.

In an example embodiment, at least one of the first frame or the second frame has a rectangular shape.

In an example embodiment, the first frame extends in a direction at an angle of up to 35 degrees from the second frame.

In an example embodiment, the angle between the first frame and the second frame is manually adjustable.

In an example embodiment, the sheet includes a plurality of folds each having a first side and a second side.

In an example embodiment, each of the plurality of folds has a rectangular shape.

In an example embodiment, the plurality of folds are configured to stack on top of each other when compressed between the first frame and the second frame and to extend when pulled between the first frame and the second frame.

In an example embodiment, an assembly is provided. The example assembly includes two conveyors. The example assembly includes a chute extending between the two conveyors, where the chute may be angled away from at least one of the two conveyors. The example assembly includes a gap filler configured to fill a gap between the chute and the at least one of the two conveyors. The example gap filler includes a sheet having a sheet first end and a sheet second end, where the sheet first end and the sheet second end are on opposing ends of the sheet. The example gap filler includes a first frame coupled to the sheet first end. The example gap filler includes a second frame coupled to the sheet second end. In an example embodiment, the sheet is shaped into a fan-like formation when the first frame extends in a direction angled away from the second frame.

In an example embodiment, the sheet is made of rubber.

In an example embodiment, at least one of the first frame or the second frame is made of metal.

In an example embodiment, at least one of the first frame or the second frame has a rectangular shape.

In an example embodiment, the first frame extends in a direction at an angle of up to 35 degrees from the second frame.

In an example embodiment, the angle between the second frame and the first frame is manually adjustable.

In an example embodiment, the sheet includes a plurality of folds each having a first side and a second side.

In an example embodiment, each of the plurality of folds has a rectangular shape.

In an example embodiment, the gap filler is attached to the chute by one or more clips.

In an example embodiment, the one or more clips are attached to at least one of the first frame or the second frame.

BRIEF DESCRIPTION OF THE DRAWINGS

Figure 1:
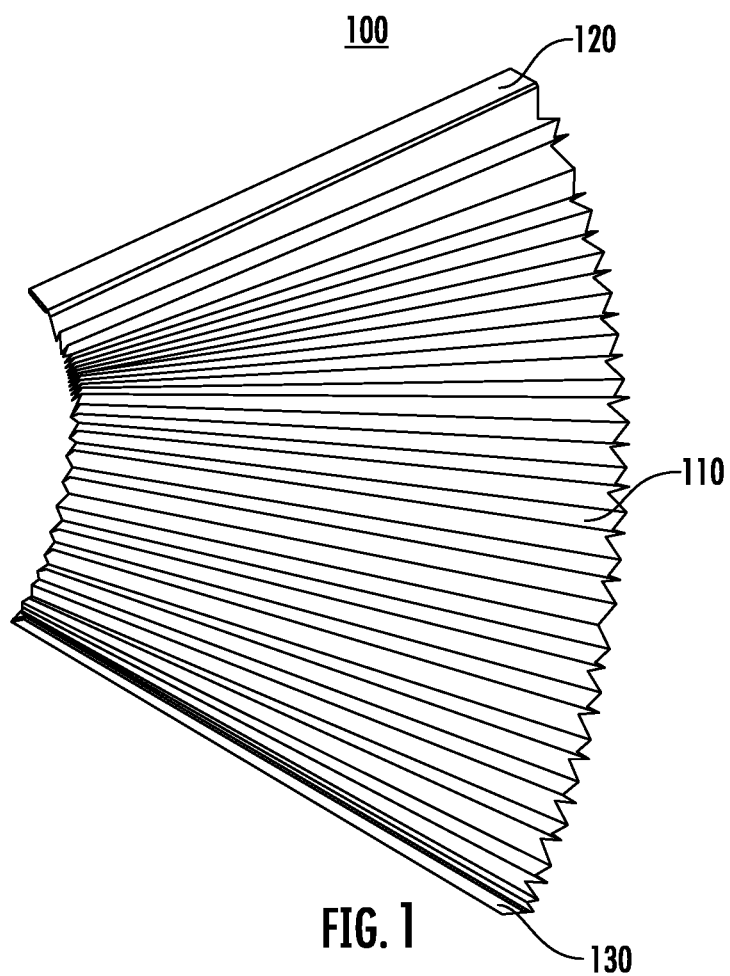

Having thus described certain example embodiments of the present disclosure in general terms above, non-limiting and non-exhaustive embodiments of the subject disclosure are described with reference to the following figures, which are not necessarily drawn to scale and wherein like reference numerals refer to like parts throughout the various views unless otherwise specified. The components illustrated in the figures may or may not be present in certain embodiments described herein. Some embodiments may include fewer (or more) components than those shown in the figures.

FIG. 1 provides a front view of an example gap filler in accordance with an example embodiment.

Figure 2A:
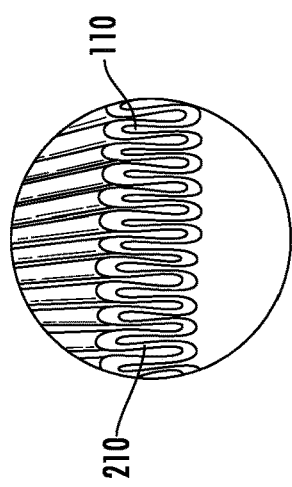
Figure 2C:
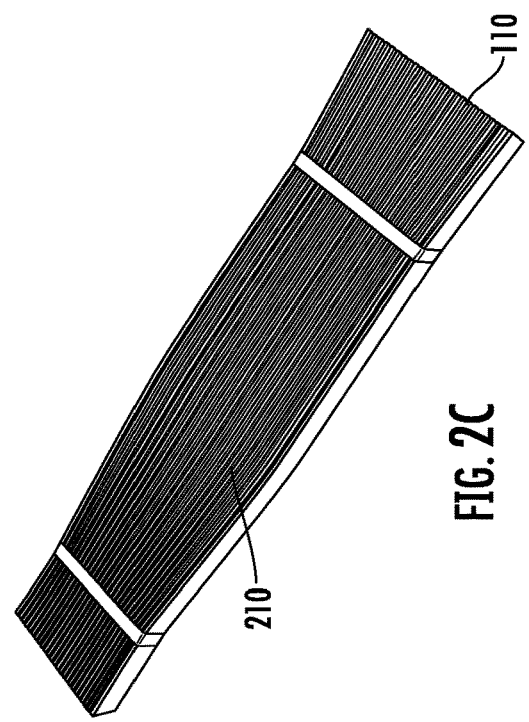
Figure 2B:
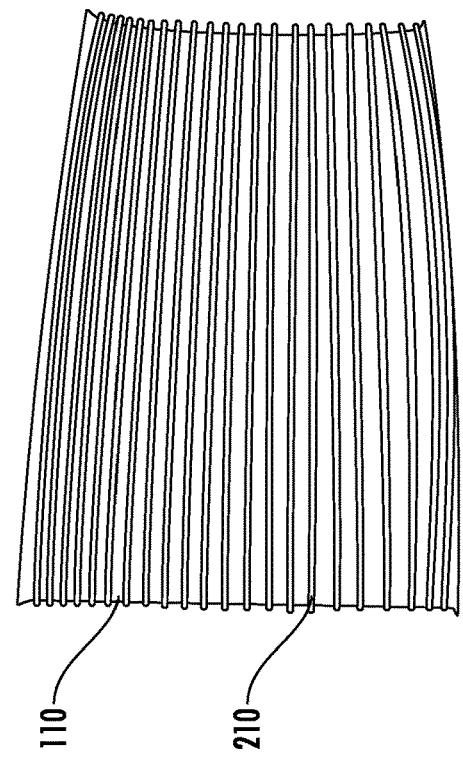

FIGS. 2A-2C provide an illustration of a plurality of folds in accordance with an example embodiment.

Figure 3:
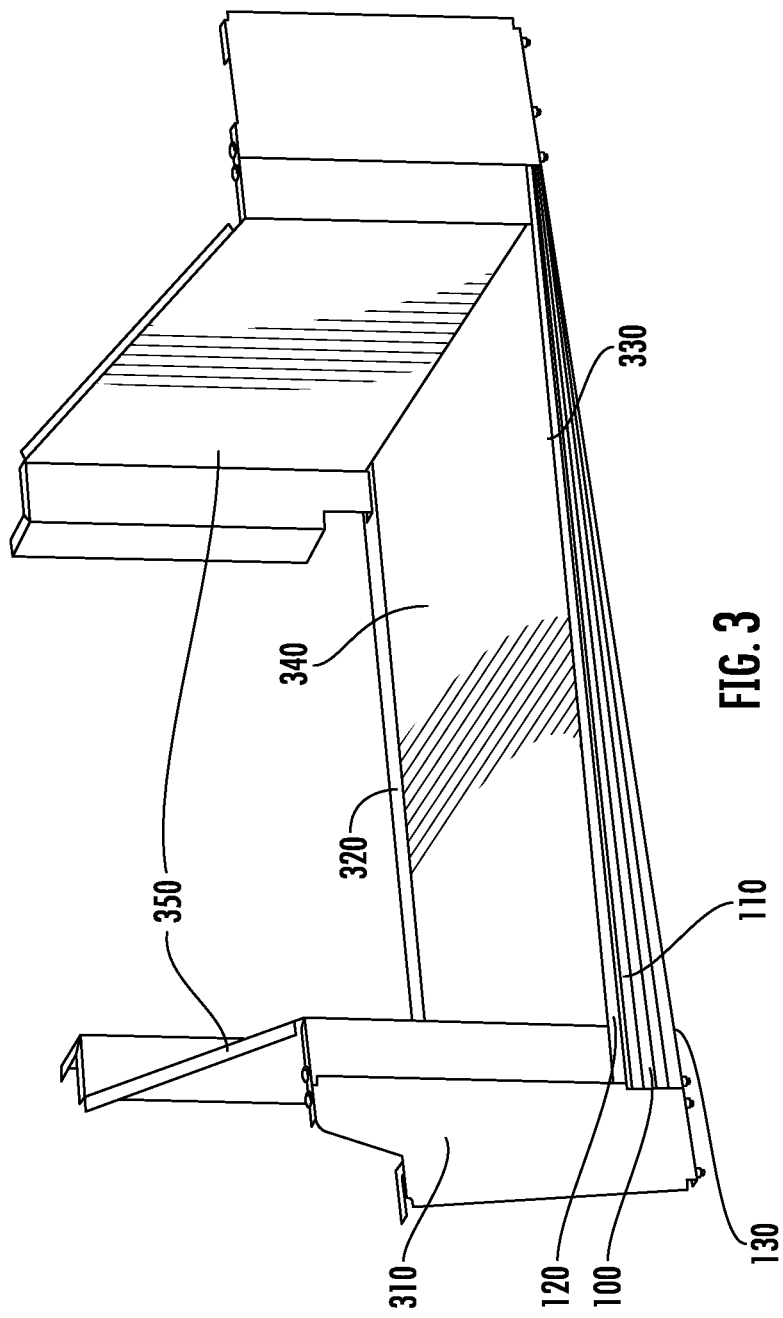

FIG. 3 provides a perspective view of a gap filler attached to a chute in accordance with an example embodiment.

Figure 4:
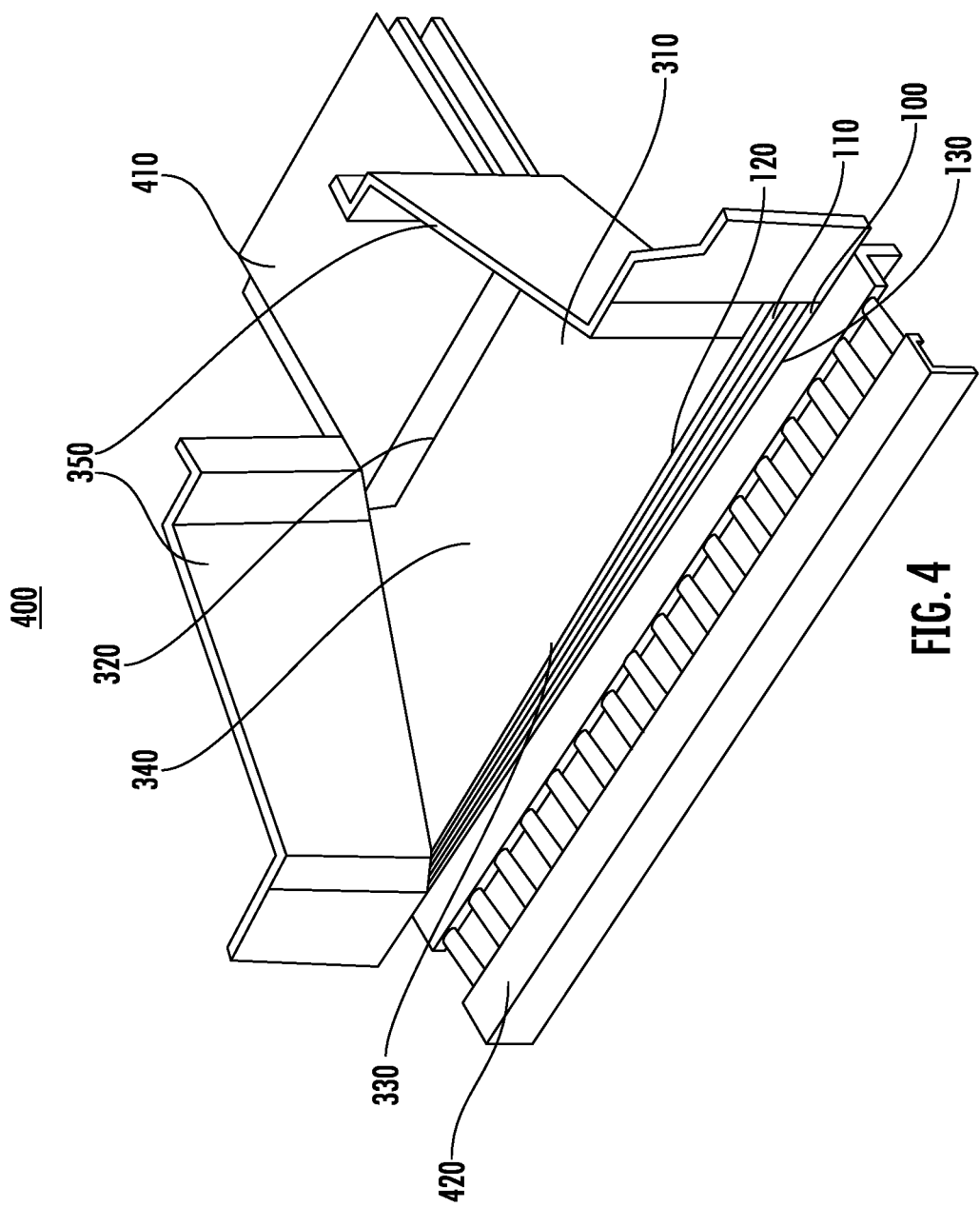

FIG. 4 provides a perspective view of an assembly including a gap filler, a chute, and two conveyors in accordance with an example embodiment.

Figure 5:
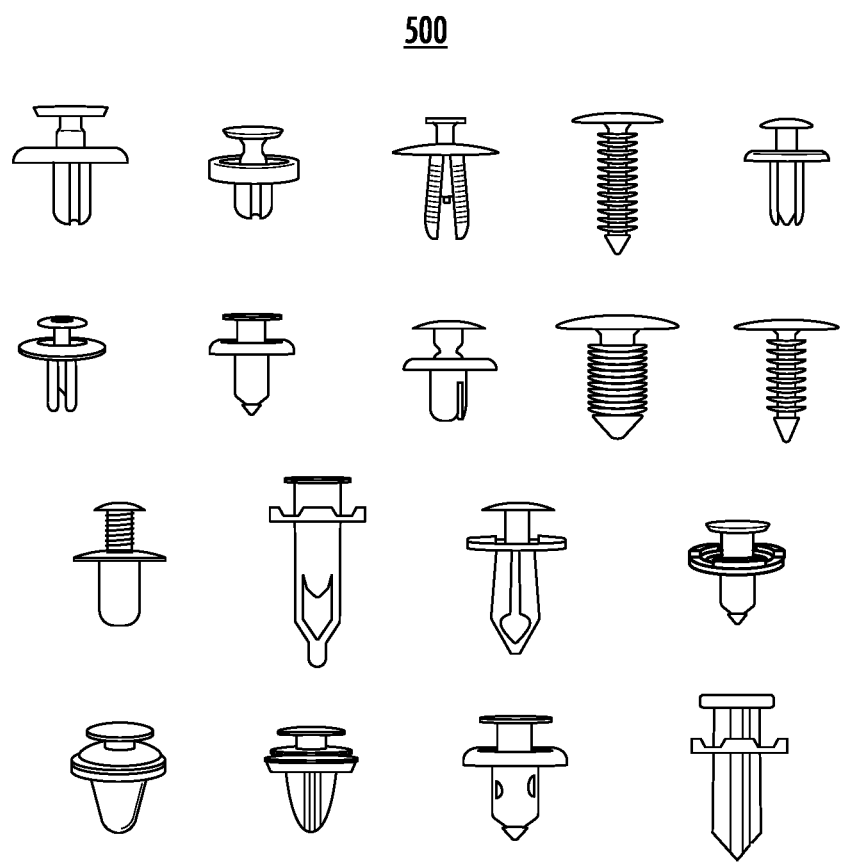

FIG. 5 provides a plurality of clips that may be used to attach a gap filler to a chute and/or a conveyor in accordance with an example embodiment.

DETAILED DESCRIPTION

One or more embodiments are now fully described with reference to the accompanying drawings, wherein like reference numerals are used to refer to like elements throughout and in which some, but not all embodiments of the invention are shown. In the following description, for purposes of explanation, numerous specific details are set forth in order to provide a thorough understanding of the various embodiments. It is evident, however, that the various embodiments can be practiced without these specific details. It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements.

As used herein, the term "exemplary" means serving as an example, instance, or illustration. Any aspect or design described herein as "exemplary" is not necessarily to be construed as preferred or advantageous over other aspects or designs. Rather, use of the word exemplary is intended to present concepts in a concrete fashion. In addition, while a particular feature may be disclosed with respect to only one of several implementations, such feature may be combined with one or more other features of the other implementations as may be desired and advantageous for any given or particular application. Furthermore, to the extend that the terms "includes" and "including" and variants thereof are used in either the detailed description or the claims, these terms are intended to be inclusive in a manner similar to the term "comprising."

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "coupled," "fixed," "attached to," and the like refer to both direct coupling, fixing, or attaching, as well as indirect coupling, fixing, or attaching through one or more intermediate components or features, unless otherwise specified herein. As used herein, coupling can be accomplished through welding one component to another component.

As used herein, the term "positioned directly on" refers to a first component being positioned on a second component such that they make contact. Similarly, as used herein, the term "positioned directly between" refers to a first component being positioned between a second component and a third component such that the first component makes contact with both the second component and the third component. In contrast, a first component that is "positioned between" a second component and a third component may or may not have contact with the second component and the third component. Additionally, a first component that is "positioned between" a second component and a third component is positioned such that there may be other intervening components between the second component and the third component other than the first component.

A chute, in some examples, may be placed between two conveyers so as to allow for the transportation of goods, items, and/or packages. In some examples, a gap filler may be used in conjunction with or otherwise be a part of a chute. It is desirable, in some examples, for a gap filler to be flexible to fill a variety of gaps between a chute and a conveyor. For example, a chute may be angled away from a conveyor and create a variety of gap sizes. As such and by way of example, objects traversing the chute may get stuck in the gap between the chute and the conveyor. For example, a metal gap filler may need to be specifically designed and manufactured for a gap between a chute and a conveyor. In contrast, an example flexible gap filler is configured to prevent objects from getting stuck when crossing a chute to a conveyor.

Example embodiments of the present disclosure include, but are not limited to, a gap filler that, in some examples, is configured to fill a gap between a chute and a conveyor. Embodiments of the present disclosure include, but are not limited to, a gap filler that may be adjusted to fill a variety of gap sizes and angles. In some examples, an adjustable or otherwise flexible gap filler is able to accommodate a variety of gaps and does not need to be designed and manufactured repeatedly. In further examples, the adjustable or otherwise flexible gap filler is configured to be in fan-like in that a first end may be compressed and second end may be uncompressed with a sheet disposed to opposing frame members. In some examples, the sheet may be pleated such that when compressed, the sheets folds in a fan-like manner.

Referring now to FIG. 1, an example gap filler 100 for use in conjunction with or be otherwise a part of a chute is provided. In one or more embodiments, the gap filler 100 includes a sheet 110 having a sheet first end and a sheet second end, where the sheet first end and the sheet second end are on opposing ends of the sheet. In one or more embodiments, the sheet first end of sheet 110 is coupled to first frame 120. In one or more embodiments, the sheet second end of sheet 110 is coupled to second frame 130. First frame 120 and second frame 130 are opposed from one another and, upon the application of force, can be brought into proximity at either end or at both ends.

In one or more embodiments, the first sheet end of the sheet 110 is coupled to an edge of the first frame 120. For example, first frame 120 can be coupled to sheet 110 using glue, clamps, or a variety of other means. Additionally or alternatively, the first sheet end of sheet 110 may be coupled to a main body of the first frame 120 using at least any of the means listed above.

In or more embodiments, the second sheet end of the sheet 110 is coupled to an edge of the second frame 130. For example, second frame 130 can be coupled to sheet 110 using glue, clamps, or a variety of other means. Additionally or alternatively, the second sheet end of sheet 110 may be coupled to a main body of the second frame 130 using at least any of the means listed above.

In one or more embodiments, sheet 110 has a rectangular shape. For example, sheet 110 may include four sides, including the first sheet end, the second sheet end, and two sheet sides opposite one another and extending between frame 120 and frame 130. For example, the first sheet end and the second sheet end may equal in length to one another, and the two sheet sides may be equal in length to one another. As an example, the two sheet sides may be equal in length to the first sheet end and the second sheet end (e.g., 200 mm). Alternatively, the two sheet sides may be a different length than the first sheet end and the second sheet end.

In one or more embodiments, sheet 110 is flexible. For example, sheet 110 may be compressed or extended between the first frame 120 and the second frame 130. For example, sheet 110 may be partially compressed and partially extended. In one or more embodiments, sheet 110 may be compressed on one side and extended on the other side so as to fill gaps of varying sizes and shapes. For example, by compressing on a first side and extending on an opposing end, the sheet may be formed 110 into a triangular shape. In additional examples, the sheet 110 may be able to fill a square, rectangular, or other shape gap.

In an example way to form the sheet into a triangular shape, the sheet 110 may be compressed between the first frame 120 and the second frame 130 such that the first frame 120 extends in a direction angled away from the second frame 130. For example, the sheet may be shaped into a fan-like formation when first frame 120 extends in a direction angled away from the second frame 130.

In an example, first frame 120 and second frame 130 may be in contact at one side and spread the sheet 110 out on the other side. Alternatively, first frame 120 and second frame 130 may not be in contact but may be positioned more closely on one side than the other, resulting in an irregular quadrilateral shape for sheet 110. In an example embodiment, frame 120 extends in a direction at an angle of up to 35 degrees from frame 130 in order for sheet 110 to fill a gap. In an example embodiment, this angle is manually adjustable. For example, frame 120 and/or frame 130 may be manually moved so that the gap filler 100 fills gaps of different shapes and sizes.

In one or more embodiments, sheet 110 is made of a flexible material. For example, sheet 110 may be made of rubber. As another example, sheet 110 may be made at least partially of plastic.

In one or more embodiments, sheet 110 includes one or more hard rib components. For example, sheet 110 may have a metal skeleton. For example, sheet 110 may have a plurality of metal ribs. Additionally or alternatively, sheet 110 has a skeleton formed by a non-metal hard material. For example, sheet 110 has a plurality of ribs formed at least partially by a non-metal hard material. Alternatively or additionally, in other example embodiments, the material may be semi-rigid and form a skeleton in the sheet 10 (e.g., by a plurality of ribs).

In one or more embodiments, frame 120 has a rectangular shape. As an example, frame 120 may have a length that extends across the first sheet end of the sheet 110. Frame 120 may have a width that is greater than the thickness of the sheet 110. In an example embodiment, frame 120 includes a plurality of apertures. For example, the plurality of apertures may be spaced along the length of frame 120.

In one or more embodiments, frame 120 is made from a hard or semi-hard material. For example, frame 120 may be made of metal. Alternatively or additionally, frame 120 may be made at least partially of plastic.

In one or more embodiments, frame 120 may be coupled to another object, for example, a chute or a conveyor. In one or more embodiments, frame 120 is attached to another object via screws, bolts, clips that are placed through apertures of frame 120.

In one or more embodiments, frame 130 has a rectangular shape. As an example, frame 130 may have a length that extends across the second sheet end of the sheet 110. Frame 130 may have a width that is greater than the thickness of the sheet 110. In an example embodiment, frame 130 includes a plurality of apertures. For example, the plurality of apertures may be spaced along the length of frame 130.

In one or more embodiments, frame 130 is made from a hard or semi-hard material. For example, frame 130 may be made of metal. Alternatively or additionally, frame 130 may be made at least partially of plastic.

In one or more embodiments, frame 130 may be coupled to another object, for example, a chute or a conveyor. In one or more embodiments, frame 130 is attached to another object via screws, bolts, clips that are placed through apertures of frame 130.

Turning now to FIG. 2A, a closeup view of a side sheet 110 is provided. In one or more embodiments, sheet 110 includes a plurality of folds 210 each having a first side and a second side.

In one or more embodiments, each of the folds 210 has a rectangular shape. In an example embodiment, each of the folds 210 has a length equal to the length of the sheet 110. In an example embodiment, each of the folds has a width equal to the width of first frame 120 and/or second frame 130 (e.g., 15 mm). Additionally or alternatively, each of the folds may have a width smaller or larger than the first frame 120 and/or the second frame 130.

In one or more embodiments, each of the folds 210 is made of a flexible material. For example, each of the folds 210 may be made of a rubber material. As another example, each of the folds 210 may be made at least partially of plastic.

In one or more embodiments, sheet 110 includes a rib in between each fold 210. Example ribs may be made of a hard or semi-hard material. For example, each rib may be made of a metal material. As another example, each rib may be made at least partially of plastic.

In one or more embodiments, the plurality of folds 210 are configured to allow the sheet 110 to extend and compress. For example, the plurality of folds 210 are configured to stack on top of each other when compressed between the first frame 120 and the second frame 130 and to extend when pulled between the first frame 120 and the second frame 130. In an example embodiment, each of the folds 210 alternate directions when stacked. In an example embodiment, each of the plurality of folds may be compressed on the first side and extended on the second side, or vice versa.

Turning now to FIG. 2B, an example sheet 110 is illustrated when the plurality of folds 210 are extended. In an example embodiment, when the sheet 110 is pulled apart, the plurality of folds 210 are unstacked. For example, as the sheet 110 is pulled apart between frame 120 and frame 130, the plurality of folds 210 form a zig-zag shape. As another example, when sheet 110 is stretched fully apart, the plurality of folds 210 are stretched into a flat sheet 110. In an example where the plurality of folds 210 are stretched into a flat sheet 110, the sheet 110 is at its greatest height.

Turning now to FIG. 2C, an example sheet 110 is illustrated when the plurality of folds 210 are compressed. For example, when frames 120 and 130 of the example sheet 110 of are compressed together, the plurality of folds 210 are stacked. In one or more embodiments, when the plurality of folds 210 are stacked, the sheet 110 is at its shortest height.

Turning now to FIG. 3, an example illustration of a gap filler 100 coupled to a chute 310 is illustrated. In one or more embodiments, frame 120 of gap filler 100 is coupled to chute 310. For example, frame 120 may be flush with slide 340 of chute 310. In an alternative example, frame 120 is coupled below slide 340 of chute 310. As another example, frame 120 is coupled to chute 310 at exit point 330. In example embodiments, frame 120 is coupled to chute 310 by glue, screws, clips, and/or the like.

In one or more embodiments, chute 310 is configured to be placed between two conveyors. In an example embodiment, chute 310 includes an entry point 320 and an exit point 330. In some examples, entry point 320 is at a higher elevation than exit point 330. Additionally, an example slide 340 may be placed between the entry point 320 and the exit point 330. An example chute 310 includes two walls 350 that are positioned on either side of on slide 340 between entry point 320 and exit point 330. In one or more embodiments, the walls 350 are further apart at the exit point 330 than at the entry point 320, forming a reverse-funnel structure. For example, a distance between the walls 350 may widen uniformly between entry point 320 and exit point 330. In an example embodiment, the slide 340 widens with the walls 350 towards the exit point 340.

In one or more embodiments, chute 310 is set at an angle away from a level orientation. For example, the angle of chute 310 from a level orientation may be between 0 and 35 degrees. In example embodiments, the angle of chute 310 from a level orientation creates a gap underneath chute 310.

In one or more embodiments, the gap is filled by gap filler 100. For example, the first frame 120 may extend along exit point 330 while second frame 130 maintains a level orientation. In an example embodiment, this allows the sheet 110 to fan out and cover the front of the gap underneath chute 310.

Turning now to FIG. 4, an example assembly 400 is provided. In one or more embodiments, the assembly 400 includes a gap filler 100, a chute 310, a first conveyor 410, and a second conveyor 420.

In one or more embodiments, first conveyor 410 is coupled to entry point 320 of chute 310. In an example embodiment, first conveyor 410 is configured to transport objects to entry point 320 of chute 310. For example, conveyor 410 may bring an object to entry point 320 with enough momentum to send the object down slide 340.

In one or more embodiments, second conveyor 420 is placed after exit point 330. In an example embodiment, second conveyor 420 moves across exit point 330. For example, second conveyor 420 may move an object from a first side of chute 310 to a second side of chute 310.

In one or more embodiments, chute 310 is set at an angle away from second conveyor 420. In an example embodiment, this may create a gap that can be filled by sheet 110 of gap filler 100.

In one or more embodiments, frame 130 of gap filler 100 is coupled to second conveyor 420. For example, frame 130 may be flush with the top of second conveyor 420. As another example, frame 130 may be coupled below or above second conveyor 420. Frame 130 may be coupled to second conveyor 420 by, for example, glue, screws, clips, and/or the like.

Turning now to FIG. 5, a plurality of example clips 500 are illustrated. In one or more embodiments, any one of the plurality of clips 500 may be used to couple a gap filler 100 to a chute 310, a second conveyor 420, and/or the like.

In one or more embodiments, the one or more clips 500 are attached to at least one of the first frame 120 or the second frame 130. For example, any one of the plurality of clips 500 may extend through an aperture of first frame 120 or second frame 130 of gap filler 100. Additionally or alternatively, the plurality of clips 500 may extend through an aperture of chute 310 and/or second conveyor 420. Additionally or alternatively, other attachment means may be used between gap filler 100 and objects such as chute 310 and/or second conveyor 420. For example, glue, screws, and/or the like may be used to couple gap filler 100 with chute 310, second conveyor 420, and/or the like.

Conclusion

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the appended claims below. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A gap filler comprising:
a sheet having a sheet first end and a sheet second end, wherein the sheet first end and the sheet second end are on opposing ends of the sheet;
a first frame configured to be coupled between the sheet first end and a chute; and
a second frame configured to be coupled between the sheet second end and at least one conveyor, wherein the chute is set at an angle away from the at least one conveyor,
wherein the sheet is shaped into a fan-like formation when the first frame is extended in a direction angled away from the second frame.

2. The gap filler of claim 1, wherein the sheet is made of rubber.

3. The gap filler of claim 1, wherein at least one of the first frame or the second frame is made of metal.

4. The gap filler of claim 3, wherein at least one of the first frame or the second frame has a rectangular shape.

5. The gap filler of claim 1, wherein the first frame extends in a direction at an angle of up to 35 degrees from the second frame.

6. The gap filler of claim 5, wherein the angle between the first frame and the second frame is manually adjustable.

7. The gap filler of claim 1, wherein the sheet comprises a plurality of folds each having a first side and a second side.

8. The gap filler of claim 7, wherein each of the plurality of folds has a rectangular shape.

9. The gap filler of claim 8, wherein the plurality of folds are configured to stack on top of each other when compressed between the first frame and the second frame and to extend when pulled between the first frame and the second frame.

10. An assembly, comprising:
two conveyors;
a chute extending between the two conveyors, wherein the chute may be angled away from at least one of the two conveyors; and
a gap filler configured to fill a gap between the chute and the at least one of the two conveyors, comprising:
a sheet having a sheet first end and a sheet second end, wherein the sheet first end and the sheet second end are on opposing ends of the sheet;
a first frame configured to be coupled between the sheet first end and the chute; and
a second frame configured to be coupled between the sheet second end and the at least one of the two conveyor, wherein the chute is set at an angle away from the at least one of the two conveyor,
wherein the sheet is shaped into a fan-like formation when the first frame extends in a direction angled away from the second frame.

11. The assembly of claim 10, wherein the sheet is made of rubber.

12. The assembly of claim 10, wherein at least one of the first frame or the second frame is made of metal.

13. The assembly of claim 12, wherein at least one of the first frame or the second frame has a rectangular shape.

14. The assembly of claim 10, wherein the first frame extends in a direction at an angle of up to 35 degrees from the second frame.

15. The assembly of claim 14, wherein the angle between the first frame and the second frame is manually adjustable.

16. The assembly of claim 10, wherein the sheet comprises a plurality of folds each having a first side and a second side.

17. The assembly of claim 16, wherein each of the plurality of folds has a rectangular shape.

18. The assembly of claim 17, wherein the plurality of folds are configured to stack on top of each other when compressed between the first frame and the second frame and to extend when pulled between the first frame and the second frame.

19. The assembly of claim 18, wherein the gap filler is attached to the chute by one or more clips.

20. The assembly of claim 19, wherein the one or more clips are attached to at least one of the first frame or the second frame.

* * * * *